UNITED STATES PATENT OFFICE.

JOHN VAUGHAN SHERRIN, OF LONDON, ENGLAND.

PROCESS OF MAKING VARNISH.

SPECIFICATION forming part of Letters Patent No. 649,080, dated May 8, 1900.

Application filed November 10, 1899. Serial No. 736,520. (No specimens.)

*To all whom it may concern:*

Be it known that I, JOHN VAUGHAN SHERRIN, a subject of the Queen of Great Britain, residing at 28 Victoria street, Westminster, London, in the county of Middlesex, England, have invented new and useful Improvements in the Manufacture of Varnishes, of which the following is a specification.

According to this invention I manufacture varnishes, drying-oils, and enamel paints possessing great durability during exposure to atmospheric and other adverse influences and in a cheaper manner than heretofore.

In order to produce a varnish, I heat a small proportion—say ten parts, by measure—of linseed-oil to about 600° Fahrenheit, (315° centigrade.) I then take about five parts of kauri-gum dust or equivalent material and sprinkle it upon the surface of the heated oil, which is meanwhile being continually agitated. To this mixture is gradually added a suitable drying agent, by preference acetate or borate of manganese—say five parts of same. Lead driers are unsuitable, because they harden the rosin which I use. Of rosin I take about forty parts in order to give body to the varnish. This rosin has first to be heated in a steam-jacketed or other suitable pan to about 400° Fahrenheit, (203° centigrade.) The rosin is being agitated while the aforesaid mixture is added thereto. The whole is then allowed to cool down to a temperature of about 90° to 100° Fahrenheit, (32° to 38° centigrade,) according to the boiling-point of the thinning agent which I next employ—viz., refined petroleum. Of this latter I now add about sixty-five parts to the mixture while agitating same. The agitation may be effected by stirrers, air-blowing, or other suitable means.

In order to manufacture a cheap and efficient substitute for the ordinary boiled oil, I heat boiled oil, ten parts, to about 600° Fahrenheit (315° centigrade) and mix therewith about two or three parts of kauri-gum dust or equivalent material and add three parts of the drying agent, preferably acetate or borate of manganese. With this I mix about forty parts of melted rosin, as in the first-named example. When the mixture has cooled to from 90° to 100° Fahrenheit, (32° to 38° centigrade,) it is thinned down with, say, about one hundred parts of the refined petroleum, the whole being thoroughly agitated, as before mentioned.

The varnish and the oil made as described are left for a time sufficient to settle, and the clear product is then drawn off ready for use.

To manufacture light-colored varnishes and paint-oils, I proceed as above described, but substitute for the kauri-gum dust gum-dammar or other suitable light-colored gum, and for the drying agent I prefer to use sulfate or borate of manganese or boracic acid.

In order to manufacture enamel paints having rapid and hard drying qualities, I proceed as for the varnish, but employ a larger proportion or about double of the drying agent and add pigments, according to the color or tint required. Those having lead for their base are, however, unsuitable.

What I claim as my invention, and desire to secure by Letters Patent, is—

1. The process for the manufacture of an oleaginous product consisting in heating linseed-oil to about 600° Fahrenheit (315° centigrade) sprinkling gradually thereon kauri-gum dust while agitating adding gradually a suitable drying agent, mixing gradually the aforesaid mixture with rosin while agitating, said rosin having previously been heated to about 400° Fahrenheit (203° centigrade) then cooling down the mixture to about 90° to 100° Fahrenheit (32° to 38° centigrade) and finally adding petroleum for thinning it down, then leaving the mixture to settle and then drawing off the clear product, substantially as and in the proportions stated.

2. The process for the manufacture of a varnish consisting in heating linseed-oil to about 600° Fahrenheit (315° centigrade) sprinkling gradually thereon kauri-gum dust while agitating adding gradually acetate of manganese, mixing gradually the aforesaid mixture with rosin while agitating, said rosin having previously been heated to about 400° Fahrenheit (203° centigrade), then cooling down the mixture to 90° to 100° Fahrenheit (32° to 38° centigrade), and finally thinning it down with refined petroleum, then leaving the mixture to settle and then drawing off the clear liquid, substantially as and in the proportions stated.

London, 31st day of October, 1899.

JOHN VAUGHAN SHERRIN.

Witnesses:
V. JENSEN,
FRED C. HARRIS.